(12) United States Patent
Kim et al.

(10) Patent No.: US 9,919,598 B2
(45) Date of Patent: Mar. 20, 2018

(54) MOBILE TERMINAL, IMAGE DISPLAY APPARATUS MOUNTED IN VEHICLE AND DATA PROCESSING METHOD USING THE SAME

(75) Inventors: Jungwoo Kim, Pyeongtaek-si (KR); Mingoo Kim, Pyeongtaek-si (KR); Kyunggeun Kim, Pyeongtaek-si (KR); Jihwan Park, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 814 days.

(21) Appl. No.: 13/591,587

(22) Filed: Aug. 22, 2012

(65) Prior Publication Data

US 2013/0055096 A1 Feb. 28, 2013

Related U.S. Application Data

(60) Provisional application No. 61/526,230, filed on Aug. 22, 2011, provisional application No. 61/561,263, (Continued)

(51) Int. Cl.
*H04W 84/18* (2009.01)
*B60K 35/00* (2006.01)
*H04W 84/00* (2009.01)

(52) U.S. Cl.
CPC .......... *B60K 35/00* (2013.01); *H04W 84/005* (2013.01); *H04W 84/18* (2013.01); *B60K 2350/355* (2013.01); *B60K 2350/357* (2013.01)

(58) Field of Classification Search
CPC ........................... H04W 48/20; H04W 84/005
See application file for complete search history.

(56) References Cited

U.S. PATENT DOCUMENTS 8,848,608 B1 * 9/2014 Addepalli et al. ............. 370/328
2004/0218620 A1 * 11/2004 Palm ...................... H04W 74/02
370/445

(Continued)

OTHER PUBLICATIONS

"Cool-Tether: Energy Efficient on-the-fly WiFi Hot-spots Using Mobile Phones" by Sharma, et al. CoNEXT '09 held Dec. 1-4, 2009 in Rome, Italy. 12 pages.*

*Primary Examiner* — Tuyetlien T Tran
*Assistant Examiner* — Patrick Ramsey
(74) *Attorney, Agent, or Firm* — Birch, Stewart, Kolasch & Birch, LLP

(57) ABSTRACT

The present invention provides an image display apparatus mounted in a vehicle, which includes a communication unit for transmitting/receiving data to/from an external mobile terminal, and a controller for generating Internet access information including Internet access environment information about the image display apparatus and controlling the communication unit to transmit the generated Internet access information to the mobile terminal, wherein the Internet access information includes at least one of Internet access state information representing whether the image display apparatus is connected to the Internet, and roaming state information representing whether a roaming service is used for Internet access of the image display apparatus. According to a mobile terminal, image display apparatus mounted in a vehicle and data processing method using the same, Internet access information can be efficiently transmitted between the mobile terminal and the image display apparatus.

15 Claims, 14 Drawing Sheets

Related U.S. Application Data filed on Nov. 18, 2011, provisional application No. 61/597,173, filed on Feb. 10, 2012.

(56) References Cited

U.S. PATENT DOCUMENTS

| | | | |
|---|---|---|---|
| 2008/0056210 A1* | 3/2008 | Yaqub | H04W 84/005 370/338 |
| 2010/0041397 A1* | 2/2010 | Chutorash et al. | 455/432.1 |
| 2011/0040900 A1* | 2/2011 | Yepez | G06F 13/385 710/10 |
| 2011/0275316 A1* | 11/2011 | Suumaki | G06K 7/10237 455/41.1 |
| 2011/0283001 A1* | 11/2011 | Jung et al. | 709/227 |
| 2012/0039248 A1* | 2/2012 | Schneider | H04W 84/005 370/328 |
| 2012/0094630 A1* | 4/2012 | Wisnewski et al. | 455/405 |
| 2012/0120934 A1* | 5/2012 | Cho | H04W 40/24 370/338 |
| 2012/0246294 A1* | 9/2012 | Eaton et al. | 709/224 |
| 2012/0265913 A1* | 10/2012 | Suumaki | H04W 4/008 710/303 |
| 2012/0315905 A1* | 12/2012 | Zhu | H04W 36/36 455/436 |
| 2013/0044635 A1* | 2/2013 | Suzuki | H04W 76/023 370/254 |
| 2013/0045678 A1* | 2/2013 | Lee | H04W 4/08 455/39 |
| 2013/0331028 A1* | 12/2013 | Kuehnel | H04W 76/02 455/41.1 |

* cited by examiner

[Drawing 1]
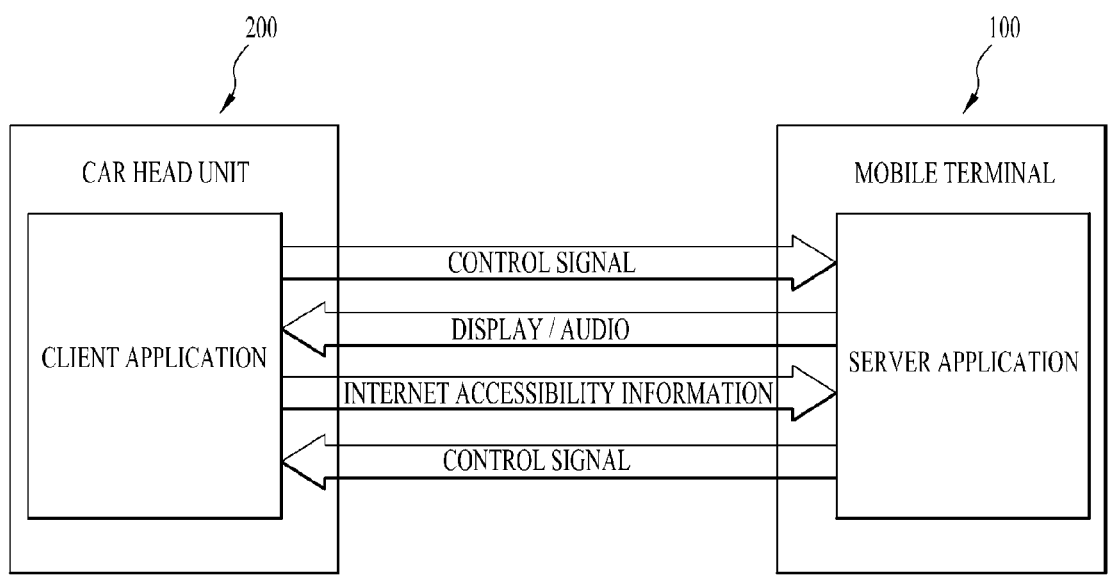

【Drawing 2】
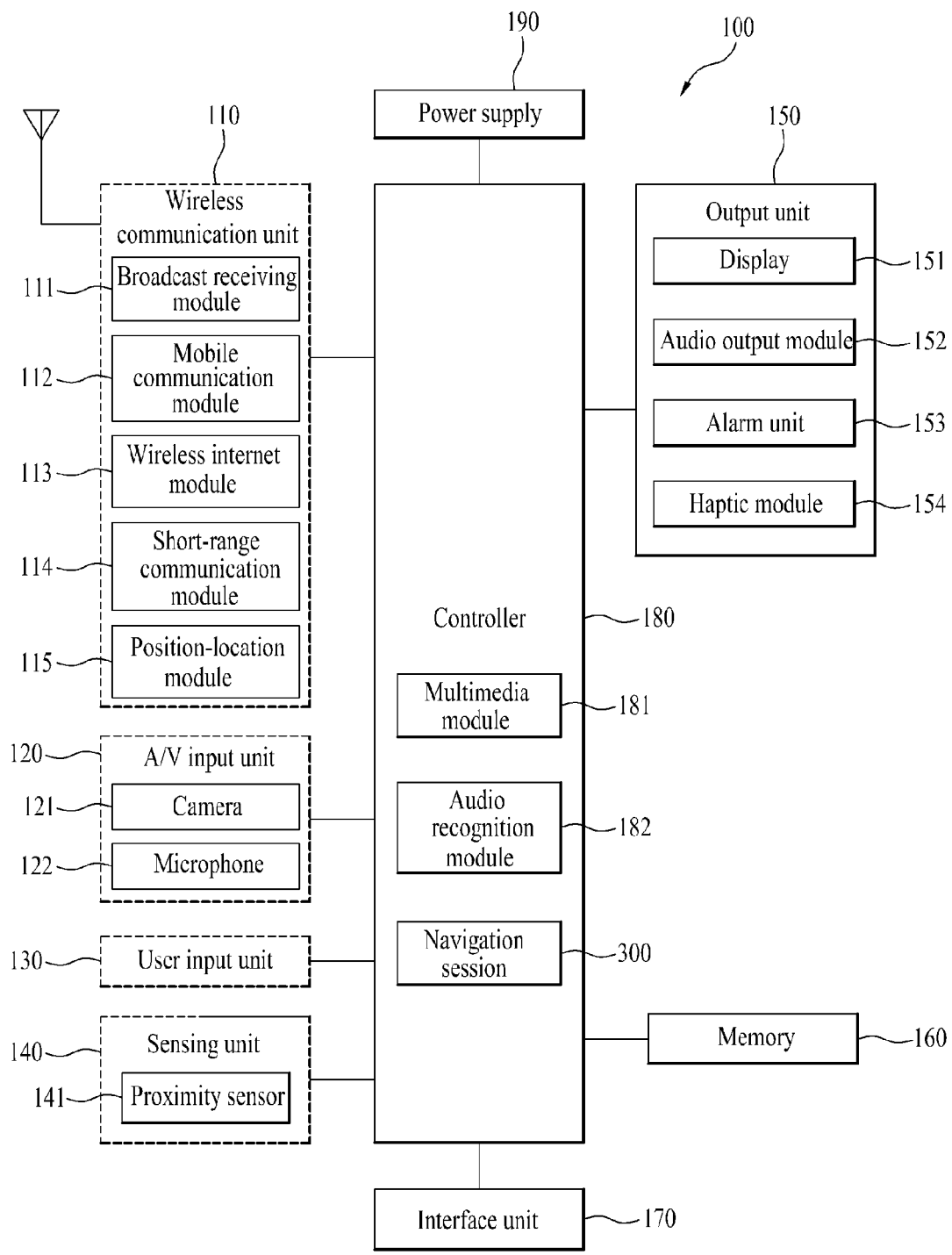

【Drawing 3】
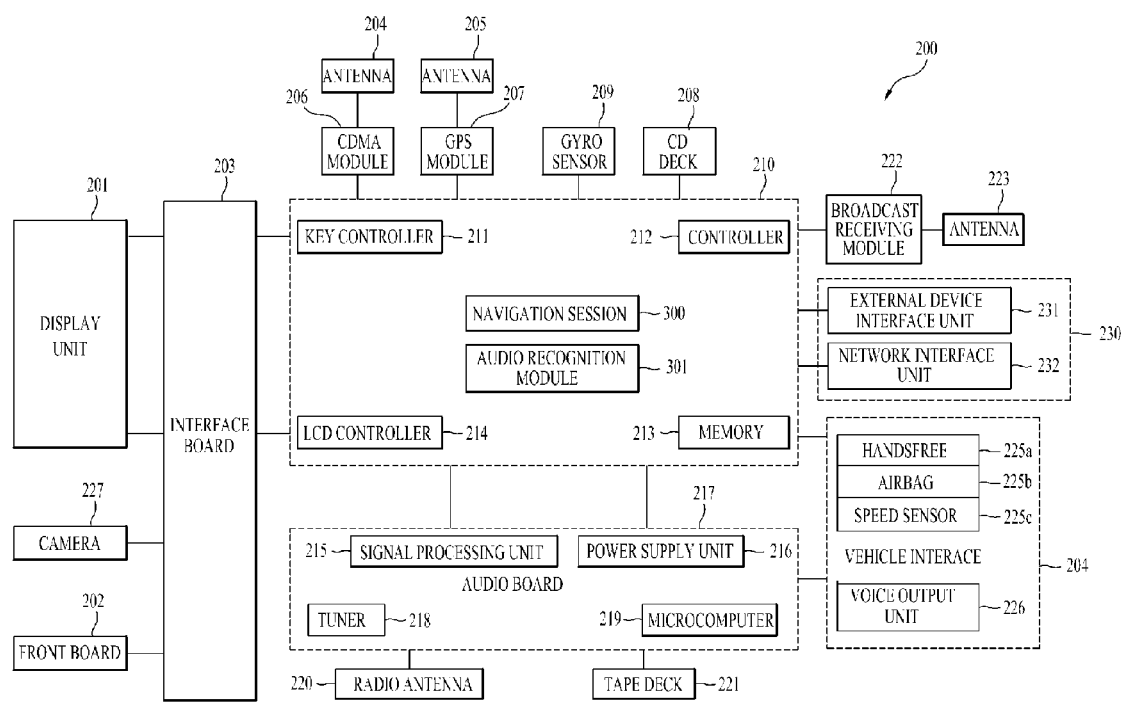

【Drawing 4】
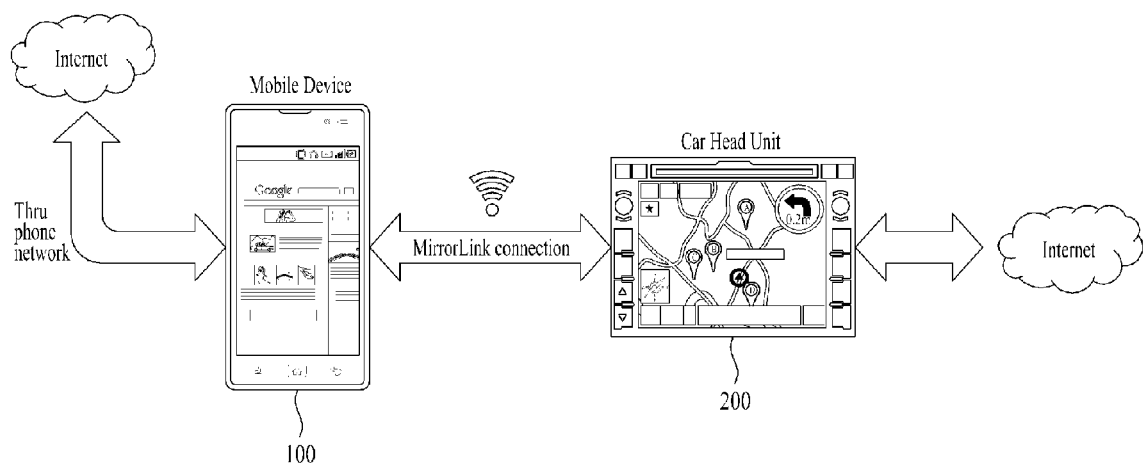

【Drawing 5】

| Internet Access Support | | WLAN Role | | A selected device for applications to access Internet |
|---|---|---|---|---|
| Mobile Device | Car Head Unit | Mobile Device | Car Head Unit | |
| Yes | Yes | AP | Client | Mobile device |
| | | Client | AP | Car Head unit or mobile device |
| Yes | No | AP | Client | Mobile device |
| | | Client | AP | Mobile device |
| No | Yes | AP | Client | n/a |
| | | Client | AP | Car Head unit |
| No | No | AP | Client | n/a |
| | | Client | AP | n/a |

【Drawing 6】
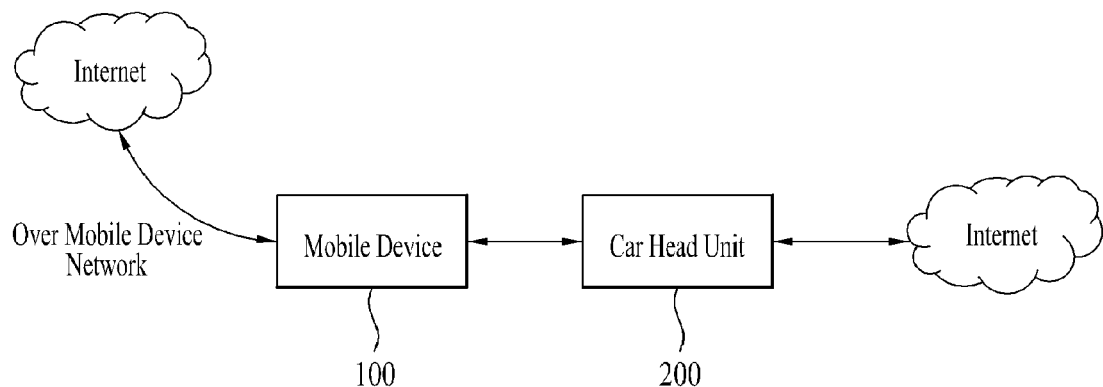

【Drawing 7】
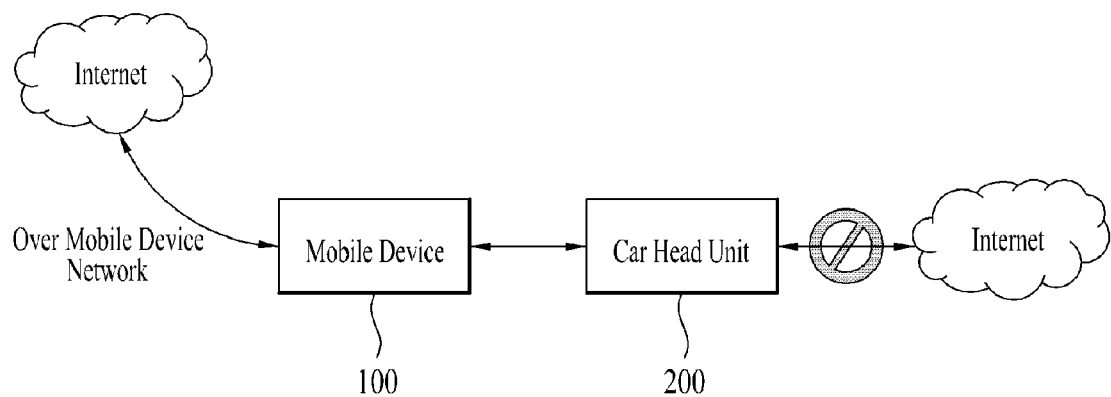

【Drawing 8】
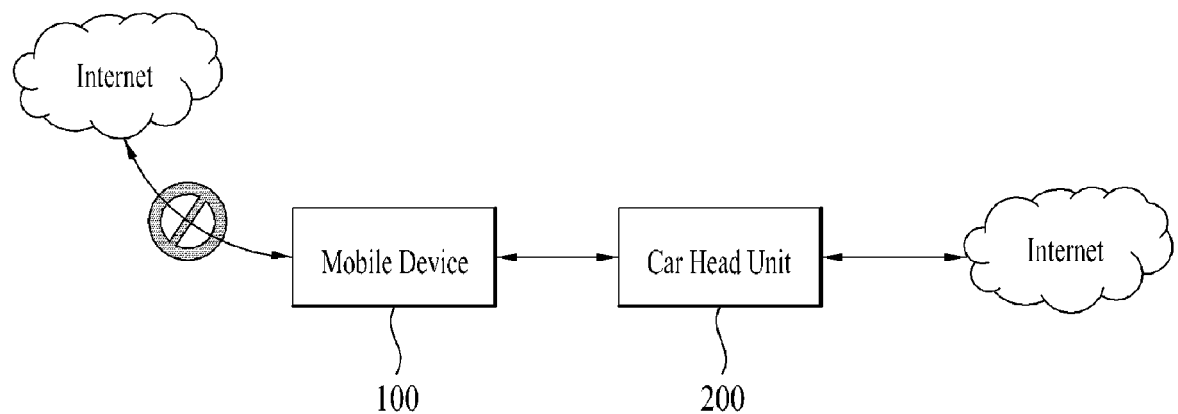

【Drawing 9】
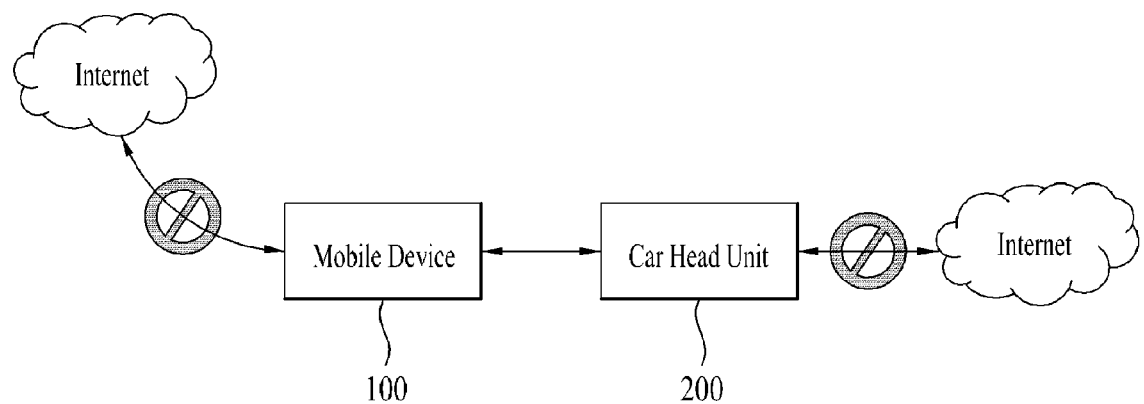

【Drawing 10】
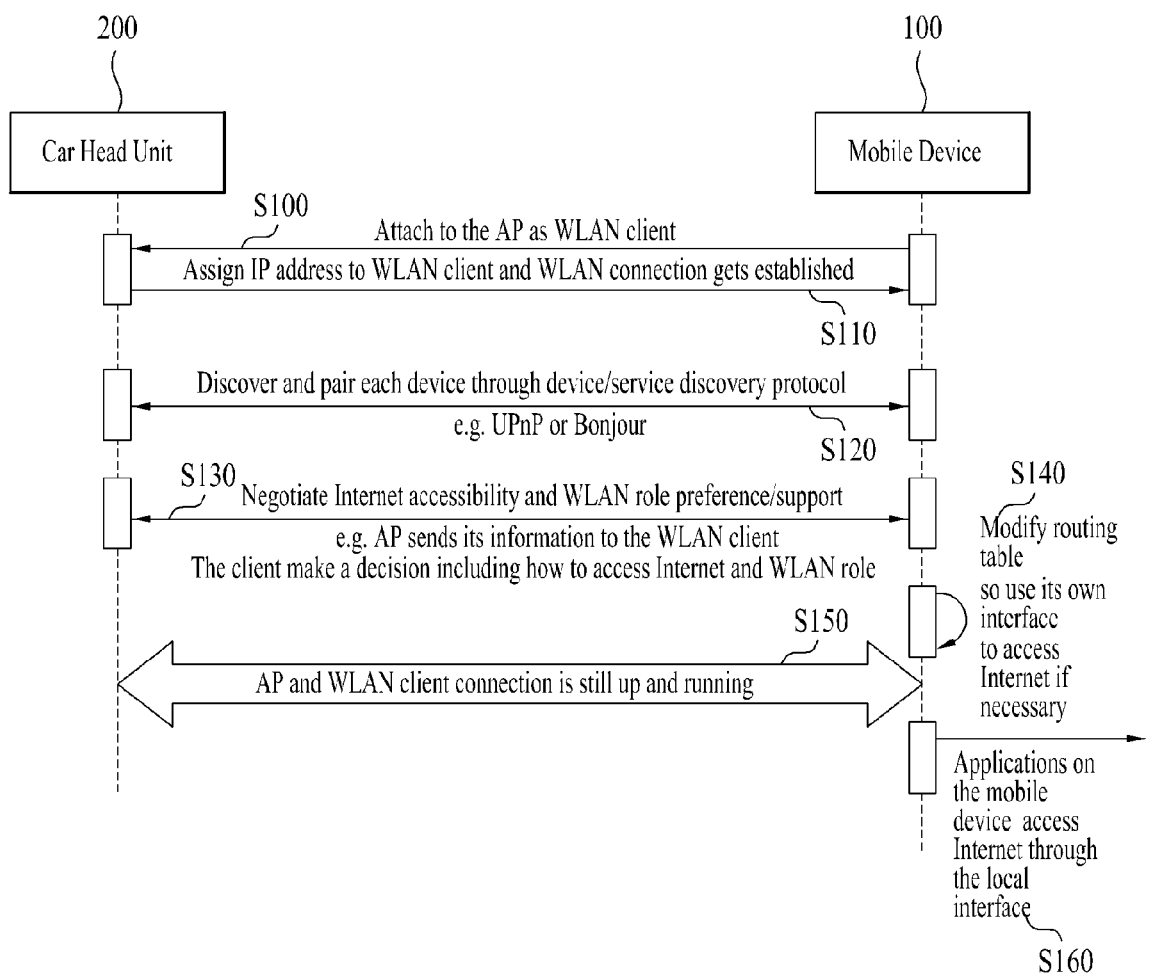

[Drawing 11]

| Element | Description | Parent |
|---|---|---|
| network | Network element contains detailed information of network capability that a device supports | deviceProfile |
| InternetAccessSupport | Availability of Internet access of a device | network |
| WLANSupport | Support of WLAN technology. In other words, it indicates whether a device can play WLAN AP and/or client | network |
| tetheringSupport | Support of tethering technology. It indicates if a device supports a tethering feature. | network |
| RoamingStatus | Roaming status | network |
| UserPreference | User preference on WiFi device that shares its Interenet connectivity [0 to 10] Higher value indicates higher user preference | network |

【Drawing 12】

| Function | Description | Arguments | Return values |
|---|---|---|---|
| GetProfile | Get a profile of a controlled device. | profileID that is an unique identifier for a profile | deviceProfile that is detailed information of a profile |
| SetProfile | Set a profile of a controlled device by a control point | profileID that is an unique identifier for a profile deviceProfile that is detailed information of a profile that a control point wants to configure on a controlled device | deviceProfile that is detailed information of a profile that will be used for a connection between a controlled device and a control point. |

【Drawing 13】
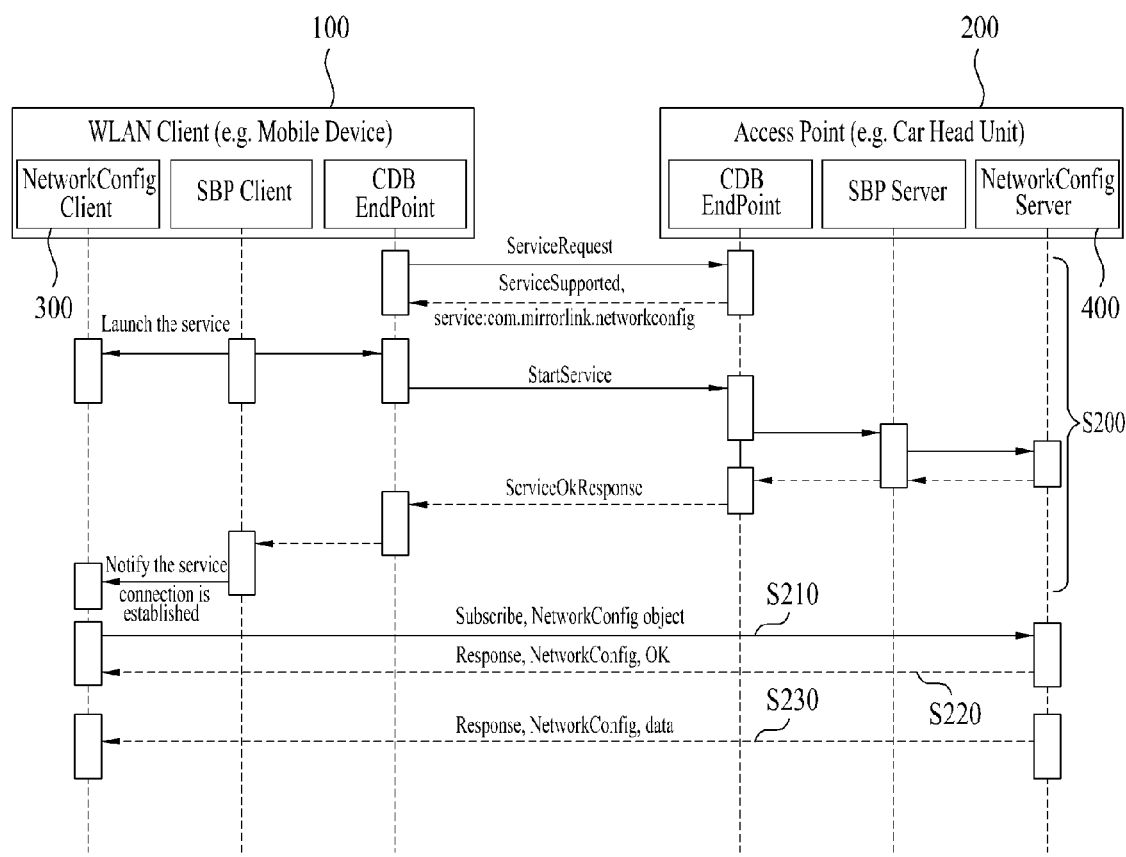

【Drawing 14】

```
/* com.mirrorlink.networkconfig service, v1.0 */
/** STRUCTURE holding network configuration including Internet accessibility information. */
STRUCTURE NetworkConfig {
    /** current Internet accessibility on access point. The value of this variable is one among active, inactive, disabled, or none*/
    STRING internetAccessSupport;

/** current tethering feature availability. The value of this variable is one among active, inactive, disabled, or none*/
    STRING tetheringSupport;

/** WLAN technology support. The value of one or combination of AP and STA */
    STRING WLANSupport;

/** Status of roaming. The value set to True indicates a device is in roaming status
    Boolean roamingStatus;

/** User preference. A device with higher value has higher chance to be selected to share its Internet connectivity to others
    INT userPreference;
};
```

MOBILE TERMINAL, IMAGE DISPLAY APPARATUS MOUNTED IN VEHICLE AND DATA PROCESSING METHOD USING THE SAME

This application claims the benefit of U.S. Provisional Patent Application Nos. 61/526,230 filed on Aug. 22, 2011; 61/561,263 filed on Nov. 18, 2011 and 61/597,173 filed on Feb. 10, 2012 which are hereby incorporated by reference as if fully set forth herein.

BACKGROUND OF THE INVENTION

Field of the Invention

The present invention relates to a mobile terminal, an image display apparatus mounted in a vehicle and a data processing method using the same, and more particularly, to a mobile terminal and an image display apparatus mounted in a vehicle, which are configured to efficiently access the Internet in various Internet access environments, and a data processing method using the same.

Discussion of the Related Art

Image display apparatuses display image information using a screen. Among them, an image display apparatus set in a vehicle provides a function of displaying information about the vehicle, a navigation function, a TV display function, etc. to users. Recent technical development enables the image display apparatus mounted in a vehicle to be linked with a mobile terminal carried by a user using a wired/wireless network to perform data communication with the mobile terminal.

Furthermore, the mobile terminal and the image display apparatus mounted in a vehicle can access the Internet and provide various functions and information to the user. In addition, the mobile terminal and the image display apparatus mounted in a vehicle can access the Internet using the other devices through data communication. That is, the image display apparatus mounted in a vehicle can access the Internet using the mobile terminal and the mobile terminal can access the Internet through the image display apparatus mounted in a vehicle.

The mobile terminal and the image display apparatus mounted in a vehicle are not fixed and are used in a moving environment, and thus an Internet access environment may change frequently.

Accordingly, it is necessary for the mobile terminal and the image display apparatus mounted in a vehicle to share Internet access information thereof in various Internet environments to efficiently provide Internet service to the user.

SUMMARY OF THE INVENTION

Accordingly, the present invention is directed to a mobile terminal, an image display apparatus mounted in a vehicle and a data processing method using the same that substantially obviate one or more problems due to limitations and disadvantages of the related art.

An object of the present invention is to provide a mobile terminal and an image display apparatus mounted in a vehicle, which are configured to efficiently access the Internet by defining Internet access information transmitted therebetween and sharing the Internet access information, and a data processing method using the same.

According to one aspect of the present invention, an image display apparatus mounted in a vehicle includes: a communication unit for transmitting/receiving data to/from an external mobile terminal; and a controller for generating Internet access information including Internet access environment information about the image display apparatus and controlling the communication unit to transmit the generated Internet access information to the mobile terminal, wherein the Internet access information includes at least one of Internet access state information representing whether the image display apparatus is connected to the Internet, and roaming state information representing whether a roaming service is used for Internet access of the image display apparatus.

The controller may control the communication unit to receive a request for the Internet access information of the image display apparatus from the mobile terminal, and generate the Internet access information of the image display apparatus according to the received request for the Internet access information of the image display apparatus.

The controller may generate the Internet access information and control the communication unit to transmit the Internet access information to the mobile terminal when the Internet access information is changed.

The mobile terminal and the image display apparatus may be linked to each other through a wireless LAN (WLAN), wherein the Internet access information further includes WLAN information representing whether the image display apparatus is set to an access point or a client in the WLAN.

The Internet access information may further include user preference information including a value representing a degree by which a user prefers the image display apparatus as an Internet access device.

The Internet access information may further include tethering information representing whether an external device connected to the image display apparatus is able to access the Internet through the image display apparatus.

According to another aspect of the present invention, a mobile terminal includes: a communication unit for transmitting/receiving data to/from an external image display apparatus; and a controller for generating Internet access information including Internet access environment information about the mobile terminal and controlling the communication unit to transmit the generated Internet access information to the image display apparatus, wherein the Internet access information includes at least one of Internet access state information representing whether the mobile terminal is connected to the Internet, and roaming state information representing whether a roaming service is used for Internet access of the mobile terminal.

The controller may control the communication unit to receive a request for the Internet access information of the mobile terminal from the image display apparatus, and generate the Internet access information of the mobile terminal according to the received request for the Internet access information of the mobile terminal.

The controller may generate the Internet access information and control the communication unit to transmit the Internet access information to the image display apparatus when the Internet access information is changed.

The mobile terminal and the image display apparatus may be linked to each other through a wireless LAN (WLAN), wherein the Internet access information further includes WLAN information representing whether the mobile terminal is set to an access point or a client in the WLAN.

The Internet access information may further include user preference information including a value representing a degree by which a user prefers the mobile terminal as an Internet access device.

The Internet access information may further include tethering information representing whether an external device connected to the mobile terminal is able to access the Internet through the mobile terminal.

According to another aspect of the present invention, a data processing method using a mobile terminal and an image display apparatus mounted in a vehicle, which are connected to each other to perform data communication, the data processing method includes: generating at least one of first Internet access information including Internet access environment information about the mobile terminal and second Internet access information including Internet access environment information about the image display apparatus; transmitting the generated Internet access information to the other device; selecting an Internet access device from the mobile terminal and the image display apparatus according to the generated Internet access information; and the mobile terminal and the image display apparatus accessing the Internet through the selected Internet access device, wherein the Internet access information includes at least one of Internet access stat information representing Internet accessibility and roaming state information representing whether a roaming service is used for Internet access.

The data processing method may further include: the mobile terminal requesting the Internet access information of the image display apparatus to the image display apparatus; and the image display apparatus generating the Internet access information thereof according to the Internet access information request and transmitting the generated Internet access information to the mobile terminal.

The Internet access information may be generated when the Internet access information is changed.

The mobile terminal and the image display apparatus may be linked to each other through a WLAN, wherein the Internet access information further includes WLAN information representing whether the mobile terminal or the image display apparatus is set to an access point or a client in the WLAN.

The Internet access information may further include user preference information including a value representing a degree by which a user prefers the mobile terminal or the image display apparatus as an Internet access device.

The Internet access information may further include tethering information representing whether an external device connected to the mobile terminal or the image display apparatus is able to access the Internet through the mobile terminal or the image display apparatus.

It is to be understood that both the foregoing general description and the following detailed description of the present invention are exemplary and explanatory and are intended to provide further explanation of the invention as claimed.

According to the mobile terminal, image display apparatus mounted in a vehicle and data processing method using the same in accordance with the present invention, Internet access information of the mobile terminal and the image display apparatus can be efficiently transmitted. Furthermore, it is possible to efficiently provide the Internet service to a user in various Internet access environments using the transmitted Internet access information.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a schematic diagram showing a data processing system including a mobile terminal and an image display apparatus mounted in a vehicle according to an embodiment of the present invention;

FIG. 2 illustrates a configuration of the mobile terminal according to an embodiment of the present invention;

FIG. 3 is a block diagram of the image display apparatus mounted in a vehicle according to an embodiment of the present invention;

FIG. 4 is a schematic diagram showing a system of connecting the mobile terminal and the image display apparatus mounted in a vehicle to the Internet according to an embodiment of the present invention;

FIG. 5 is a table showing Internet access environments for the mobile terminal and the image display apparatus mounted in a vehicle according to an embodiment of the present invention;

FIGS. 6 to 9 illustrate various Internet access environments for the mobile terminal and the image display apparatus mounted in a vehicle according to embodiments of the present invention;

FIG. 10 illustrates a method of transmitting Internet access information according to a first embodiment of the present invention;

FIG. 11 illustrates the Internet access information according to the first embodiment of the present invention;

FIG. 12 illustrates a transmission function of the Internet access information according to the first embodiment of the present invention;

FIG. 13 illustrates a method of transmitting Internet access information according to a second embodiment of the present invention; and FIG. 14 illustrates the Internet access information according to the second embodiment of the present invention.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, an image processing in an image display apparatus mounted to a vehicle according to the present invention will be explained in more detail with reference to the attached drawings. The suffixes attached to components, such as 'module' and 'unit or portion' were used for facilitation of the detailed description of the present invention. Therefore, the suffixes do not have different meanings from each other.

FIG. 1 is a view schematically illustrating a data processing system including a mobile terminal and an image display apparatus according to an embodiment of the present invention.

As shown in FIG. 1, a data processing system according to an embodiment of the present invention comprises a mobile terminal 100 and an image display apparatus 200.

The mobile terminal 100 may be connected to the image display apparatus 200 in a wired or wireless manner, and transmit at least one of a video signal and an audio signal to the image display apparatus 200.

The image display apparatus 200 is mounted to a vehicle in a fixed manner, and may be connected to the mobile terminal 100 in a wired or wireless manner to receive at least one of a video signal and an audio signal from the mobile terminal 100. And, the image display apparatus 200 may output at least one of a video signal and an audio signal received from the mobile terminal 100.

The image display apparatus 200 may receive an input from a user, and transmit the received input to the mobile terminal 100. For instance, once a user performs a touch input through a touchscreen of the image display apparatus 200, the image display apparatus 200 may recognize a position where the touch input has been performed on a screen image, and may transmit information on the recognized position to the mobile terminal 100.

The mobile terminal 100 may determine the occurrence of a touch event at a position where the touch input has been performed, and may execute an operation corresponding to the generated touch event. That is, the user may control an operation of the mobile terminal 100 by using a touch screen, a hard key, etc. of the image display apparatus 200.

As one example of a data processing system, a user executes a road guiding application (or dialing, phonebook, e-mail, moving image play application, etc.) installed at the mobile terminal 100. Then, the mobile terminal 100 transmits an execution image of the road guiding application to the image display apparatus 200 so that the execution image of the road guiding application can be displayed on the image display apparatus 200.

The user may view the execution image of the road guiding application on a large screen of the image display apparatus 200, rather than on a small screen of the mobile terminal 100. And, the user may hear a road guiding sound through a speaker of the vehicle, rather than through a speaker of the mobile terminal 100.

Once the user selects a road guidance-related menu by using a touch screen or a hard key of the image display apparatus 200, the mobile terminal 100 may execute an operation corresponding to the menu. Then, the mobile terminal 100 may output an execution result with respect to the operation corresponding to the menu to the image display apparatus 200.

The mobile terminal 100 and the image display apparatus 200 may be connected to each other by using a short-range communication standard such as Bluetooth, a wireless internet standard such as Wi-Fi, an external device interface standard such as a universal serial bus (USB), and so on.

A server application for providing a service by a client' request may be installed at the mobile terminal 100, and a client application for accessing a service provided from a server may be installed at the image display apparatus 200.

The server application of the mobile terminal 100 is configured to capture a screen of the mobile terminal 100 regardless of an application type of the mobile terminal, and transmits the captured screen to the client application of the image display apparatus 200. And, the server application controls an operation of the mobile terminal 100 based on information received from the client application, the information on an event having occurred from the image display apparatus 200.

For instance, the image display apparatus 200 may remotely control the mobile terminal 100 in a virtual network computing (VNC) manner using a remote frame buffer (RFB) protocol which provides remote access with respect to graphical user interfaces. According to the VNC method, the mobile terminal 100 transmits a screen update to the image display apparatus 200 through a network, and transmits an event having occurred from the image display apparatus 200 to the mobile terminal 100.

And, the mobile terminal 100 may transmit an audio signal to the image display apparatus 200 or a headset or a hands-free, etc., according to an advanced audio distribution profile (A2DP) which defines a sound quality of an audio signal (stereo or mono) streamed to a second device from a first device through a Bluetooth connection, especially, a headset profile (HSP) relating to a Bluetooth headset, and a hands-free profile (HFP) applied to a hands-free for a vehicle, etc.

The mobile terminal 100 and the image display apparatus 200 may exchange additional information with each other based on additional protocols. For instance, the image display apparatus 200 may provide, to the mobile terminal 100, information on a vehicle status such as travel information, speed information and fuel information.

Applications installed at the mobile terminal 100 may be executed based on information on a vehicle status received from the image display apparatus 200 by using additional protocols. These applications may provide, to the image display apparatus 200, information on an application type (e.g., road guidance, multimedia, game, etc.), a graphic user interface (GUI) type (e.g., map, video, menu, etc.), an application status (e.g., execution status in a foreground or a background).

FIG. 2 is a block diagram illustrating a configuration of the mobile terminal 100 according to the present invention. The mobile terminal 100 may be configured in various manners. For instance, the mobile terminal 100 may be implemented as a portable phone, a smart phone, a notebook computer, a digital broadcasting terminal, personal digital assistants (PDA), a portable multimedia player (PMP), etc.

As shown in FIG. 2, the mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190. FIG. 2 illustrates the mobile terminal 100 having various components, but it is understood that implementing all of the illustrated components is not a requirement. The mobile terminal 100 may be implemented by greater or fewer components.

The wireless communication unit 110 includes one or more components allowing radio communication between the mobile terminal 100 and a wireless communication system or a network in which the mobile terminal is located. For example, the wireless communication unit 110 may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160 (or another type of storage medium).

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile communication terminal. For example, the location information module 115 may include a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location information module 115, a Wi-Fi positioning system and/or a hybrid positioning system may be used.

The A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 detects a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. The mobile terminal 100 may include two or more display units 151. For example, the mobile terminal may include both an external display unit (not shown) and an internal display unit (not shown).

When the display unit 151 and a sensor for sensing a touch operation (hereinafter, will be referred to as 'touch sensor') are overlaid in a layered manner to form a touch screen, the display unit 151 may function as both an input device and an output device. The touch sensor may be a touch film, a touch sheet, a touch pad, etc.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure. When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

The proximity sensor 141 may be arranged at an inner region of the mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Accordingly, if the pointer is in proximity to the touch screen without contacting the touch screen, the position of the pointer and a distance between the pointer and the touch screen may be detected. Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm 153 outputs signals notifying the occurrence of events from the mobile terminal 100. The events occurring from the mobile terminal 100 may include call received, message received, key signal input, touch input, and so on. The alarm 153 may output not only video or audio signals, but also other types of signals such as signals notifying the occurrence of events in a vibration manner. For instance, the alarm 153 may be configured to vibrate responsive to the mobile terminal receiving a call or message. As another example, when a key signal has been inputted, the alarm 153 may output vibration as a feedback of the key signal input. Through this vibration output, a user may recognize the occurrence of an event. In order to output a signal in a vibration manner, the mobile terminal may be mounted with a vibrator. Here, the video signal or audio signal may be outputted through the display unit 151 or the audio output module 152.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100. For example, the haptic module 154 may be provided to a steering wheel, a gearshift, a lever, a seat, and the like.

The memory 160 may store a program for the processing and control of the controller 180. Alternatively, the memory 160 may temporarily store input/output data (e.g., phonebook data, messages, still images, video and the like).

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like. Here, the identification module may be a memory chip that stores various information for authenticating user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection mechanisms. The interface unit 170 may be used to receive inputs (e.g., data, information, power, etc.) from an external device and transfer the received inputs to one or more elements within the mobile terminal 100 or may be used to transfer data between the mobile terminal and an external device.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Processes described herein may be implemented in a computer-readable or its similar medium using, for example, software, hardware, or any combination thereof.

For hardware implementation, the processes may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units designed to perform the functions described herein. In some cases, such processes may be implemented by the controller 180.

For software implementation, the processes, such as procedures or functions, may be implemented together with separate software modules that allow performing of at least one function or operation. Software codes can be implemented by a software application (or program) written in any suitable programming language. The software codes may be stored in the memory 160 and executed by the controller 180.

An audio recognition module 182 is configured to recognize an audio signal generated from a user, and to execute a corresponding function according to the recognized audio signal.

A navigation session 300 applied to the mobile terminal 100 displays a travel path on map data.

FIG. 3 is a block diagram illustrating a configuration of an image display apparatus 200 according to the present invention.

As shown in FIG. 3, the image display apparatus 200 comprises a main board 210 including a controller 212 configured to control an overall operation of the image display apparatus 200 (e.g., a central processing unit: CPU), a memory 213 configured to store therein programs for processing the controller 212 and input/output data, a key controller 211 configured to control each kind of key signals, and an LCD controller 214 configured to control a liquid crystal display (LCD).

The memory 213 may store therein map information (map data) for displaying road guidance information on a digital map. Also, the memory 213 may store therein a traffic information collection control algorithm for inputting traffic information according to a road condition in which a vehicle is currently traveling, and information for controlling the algorithm.

To the main board 210, may be connected a CDMA (code division multiple access) module 206 provided with a unique device number and mounted in a vehicle, a GPS module 207 configured to receive a GPS signal for guiding a position of a vehicle and tracking a travel path from a starting point to a destination point or to transmit traffic information collected by a user in the form of a global positioning system (GPS) signal, a CD deck 208 configured to play a signal recorded in a compact disk (CD), a gyro sensor 209, etc. The CDMA module 206 and the GPS module 207 may transmit or receive signals through antennas 204 and 205.

A broadcast signal receiving module 222 may be connected to the main board 210, and may receive a broadcast signal through an antenna 223. To the main board 210, may be connected a display unit (LCD) 201 controlled by the LCD controller 214 through an interface board 203, a front board 202 controlled by the key controller 211, and a camera 227 configured to capture inside and/or outside of a vehicle. The display unit 201 is configured to display each kind of video signals and text signals. The front board 202 is provided with buttons for inputting each kind of key signals, and supplies a key signal corresponding to a button selected by a user to the main board 210. And, the display unit 201 includes the proximity sensor and the touch sensor (touch screen) of FIG. 2.

The front board 202 may be provided with a menu key for directly inputting traffic information, and the menu key may be configured to be controlled by the key controller 211.

The audio board 217 is connected to the main board 210, and processes each kind of audio signals. The audio board 217 includes a micro computer 219 configured to control the audio board 217, a tuner 218 configured to receive a radio signal, a power unit 216 configured to supply power to the micro computer 219, and a signal processor 215 configured to process each kind of audio signals.

The audio board 217 includes a radio antenna 220 configured to receive a radio signal, and a tape deck 221 configured to play an audio tape. The audio board 217 may further include an audio output unit (e.g., amplifier) 226 configured to output an audio signal processed by the audio board 217.

The audio output unit (amplifier) 226 is connected to a vehicle interface 224. That is, the audio board 217 and the main board 210 are connected to the vehicle interface 224. To the vehicle interface 224, may be connected to a hands-free unit 225a for inputting an audio signal, an air bag 225b for a passenger's safety, a speed sensor 225c for detecting a vehicle speed, etc. The speed sensor 225c is configured to calculate a vehicle speed and to provide information on the calculated vehicle speed to the central processing unit 212.

The navigation session 300 applied to the image display apparatus 200 is configured to generate road guidance information based on map data and information on a current position of a vehicle, and to provide the generated road guidance information to a user.

The display unit 201 is configured to detect a proximity touch in a display window through a proximity sensor. For instance, when a pointer (e.g., a finger or a stylus pen) executes a proximity touch, the display unit 201 detects a position where the proximity touch has occurred and output position information corresponding to the detected position to the controller 212.

An audio recognition device (or audio recognition module) 301 is configured to recognize an audio signal (voice) generated from a user, and to perform a corresponding function according to the recognized audio signal.

The navigation session 300 applied to the image display apparatus 200 displays a travel path on map data. When the mobile terminal 100 is within a preset distance from a blind spot included in the travel path, the navigation session 300 automatically forms a wireless network with a terminal mounted to a peripheral vehicle (e.g., vehicle navigation system) and/or a mobile terminal held by a passerby through a wireless communication network (e.g., short-range wireless communication network). This may allow the navigation session 300 to receive position information of the peripheral vehicle from the terminal mounted to the peripheral vehicle, and to receive position information of the passerby from the mobile terminal held by the passerby.

The main board 210 may be connected to the interface unit 230, and the interface unit 230 may include an external device interface unit 231 and a network interface unit 232.

The external device interface unit 231 may connect an external device to the image display apparatus 200. For this, the external device interface unit 231 may include an A/V input/output unit (not shown) or a wireless communication unit (not shown).

The external device interface unit 231 may be connected to an external device in a wired or wireless manner, the external device such as a DVD (Digital Versatile Disk), a Blu ray, a game player, a camera, a camcorder and a notebook computer. The external device interface unit 231 transmits, to the controller 212, a video signal or an audio signal or a data signal input from the outside through the connected external device. And, the video signal or the audio signal or the data signal processed by the controller 212 may be output to the connected external device.

The A/V input/output unit may include a USB terminal, a CVBS (Composite Video Banking Sync) terminal, a component terminal, an S-video terminal (analogue), a DVI (Digital Visual Interface) terminal, an HDMI (High Definition Multimedia Interface) terminal, an RGB terminal and a D-SUB terminal, so that an audio signal and a video signal of an external device are input to the image display apparatus 200.

The wireless communication unit may perform a short-range wireless communication with other electronic device. For instance, the image display apparatus 200 may be connected to other electronic device through a network, according to a communication standard such as Bluetooth, RFID (Radio Frequency Identification), IrDA (infrared Data Association), UWB (Ultra Wideband), ZigBee and DLNA (Digital Living Network Alliance).

The external device interface unit 231 may be connected to various set-top boxes through one of the aforementioned terminals, thereby performing inputs and outputs with the set-top boxes.

The external device interface unit 231 may receive applications inside a neighboring external device or a list of applications, and transmit the received applications or list to the controller 212 or the memory 213.

The network interface unit 130 provides an interface for connecting the image display apparatus 100 to a wired/wireless network including an internet network. The network interface unit 130 may be provided with an Ethernet terminal for connection with a wired network, and may utilize communication standards such as WLAN (Wireless LAN) (Wi-Fi), Wibro (Wireless broadband), Wimax (World Interoperability for Microwave Access), and HSDPA (High Speed Downlink Packet Access) for connection with a wireless network.

The network interface unit 232 provides an interface for connecting the image display apparatus 200 to a wired or wireless network including an internet network. The network interface unit 232 may be provided with an Ethernet terminal for accessing a wired network, and may utilize a communication standard such as WLAN (Wireless LAN) (Wi-Fi), Wibro (Wireless broadband), Wimax (World Interoperability for Microwave Access) and HSDPA (High Speed Downlink Packet Access) for accessing a wireless network.

The network interface unit 232 may transmit or receive data to/from other user or other electronic device, through an accessed network or other network linked to an accessed network. Especially, the network interface unit 232 may transmit some of contents data stored in the image display apparatus 200, to a user or an electronic device selected from a plurality of users or electronic devices pre-registered in the image display apparatus 200.

The network interface unit 232 may access a predetermined web page through an accessed network or other network linked to an accessed network. More concretely, the network interface unit 232 may access a predetermined web page through a network thus to perform data transmission or data reception with a corresponding server. Also, the network interface unit 232 may receive contents or data provided from a contents provider or a network operator. More concretely, the network interface unit 232 may receive contents of a film, an advertisement, a game, a VOD, a broadcasting signal, etc. provided from a contents provider or a network provider through a network, and information relating to the contents. The network interface unit 232 may receive update information and an update file of a firmware provided from a network operator. The network interface unit 232 may transmit data to an internet or contents provider or a network operator.

And, the network interface unit 232 may receive, through a network, a desired application by selecting from applications open to the public.

A description will be given of a method for efficiently providing the Internet service to a user using the components of the mobile terminal 100 and the image display apparatus 200 mounted in a vehicle.

The mobile terminal 100 and the image display apparatus mounted in a vehicle may be configured to be connected to each other to perform data communication and to access the Internet to provide various functions and information to a user.

In addition, the mobile terminal 100 and the image display apparatus 200 mounted in a vehicle can access the Internet using the other devices through data communication. That is, the image display apparatus 200 mounted in a vehicle can access the Internet using the mobile terminal 100 and the mobile terminal 100 can access the Internet through the image display apparatus 200 mounted in a vehicle.

The mobile terminal 100 and the image display apparatus 200 mounted in a vehicle are not fixed and are used in a moving environment, and thus an Internet access environment may change frequently.

Accordingly, it is necessary for the mobile terminal 100 and the image display apparatus 200 mounted in a vehicle to share Internet access information thereof in various Internet environments to efficiently provide Internet service to the user.

Therefore, the present invention provides the mobile terminal 100 and the image display apparatus 100 mounted in a vehicle, which are configured to efficiently access the Internet by defining Internet access information transmitted therebetween and sharing the Internet access information, and a data processing method using the same.

FIG. 4 is a schematic diagram showing a system of connecting the mobile terminal 100 and the image display apparatus 200 mounted in a vehicle to the internet according to an embodiment of the present invention.

As shown in FIG. 4, "car head unit" is exemplified as the image display apparatus 200 mounted in a vehicle in the following description.

The mobile terminal 100 and the image display apparatus 200 mounted in a vehicle may be configured to perform data communication therebetween through mirror link connection.

A mirror link is a scheme by which mirror-linked devices share information thereof through wired/wireless communication. The mobile terminal 100 and the image display apparatus 200 mounted in a vehicle can share various types of information thereof, such as screen information, vehicle state information, Internet access information, etc. through mirror link connection.

Specifically, the image display apparatus 200 mounted in a vehicle may transmit screen information thereof to the mobile terminal 100. Upon reception of the screen information from the image display apparatus 200, the mobile terminal 100 may provide the screen information to a user by displaying the screen information on a display 151 thereof, or provide a user interface by which the user can control the image display apparatus 200 mounted in a vehicle according to the screen information.

Conversely, the mobile terminal 100 may transmit screen information thereof to the image display apparatus 200 mounted in a vehicle, and the image display apparatus 200 mounted in a vehicle may output the screen information received from the mobile terminal 100 to a user.

Otherwise, the image display apparatus 200 mounted in a vehicle may receive status information on the vehicle from the vehicle and transmit the status information to the mobile terminal 100. Upon reception of the status information, the mobile terminal 100 may provide the status information to the user by displaying the status information on the display 151 or provide a user interface by which the user can control the vehicle according to the status information.

In a addition, the mobile terminal 100 and the image display apparatus 200 mounted in a vehicle may exchange and share Internet access information thereof. This will be described in detail below with reference to FIG. 10.

The mobile terminal 100 may access the Internet through a network of the mobile terminal 100. The image display apparatus 200 mounted in a vehicle may access the Internet through a network of the image display apparatus 200.

For example, the mobile terminal 100 and the image display apparatus 200 mounted in a vehicle can access the Internet through networks respectively corresponding thereto, such as 3G, 4G, Wi-Fi networks.

FIG. 5 is a table showing Internet access environments for the mobile terminal 100 and the image display apparatus 200 mounted in a vehicle according to an embodiment of the present invention.

The mobile terminal 100 and the image display apparatus 200 mounted in a vehicle are connected to each other in a wireless manner such that they can perform data communication. That is, the mobile terminal 100 and the image display apparatus 200 construct a wireless LAN (WLAN).

In WLAN, a device serving as a data relay may be referred to as an access point (AP) and a device that is connected to the access point and transmits/receives data through the access point may be referred to as a client.

As described above, the mobile terminal 100 and the image display apparatus 200 mounted in a vehicle may access the Internet using the other devices through data communication. That is, the image display apparatus 200 mounted in a vehicle can access the Internet through the mobile terminal 100 whereas the mobile terminal 100 can access the Internet through the image display apparatus 200 mounted in a vehicle. A technique of connecting a device to the Internet using another device is called tethering.

Since the mobile terminal 100 and the image display apparatus 200 mounted in a vehicle are not fixed and are used in a moving environment, an Internet access environment may change frequently.

For example, the mobile terminal 100 and the image display apparatus 200 mounted in a vehicle can access the Internet according to situation. That is, both the mobile terminal 100 and the image display apparatus 200 mounted in a vehicle may access the Internet or only one of them my access the Internet. Otherwise, both the mobile terminal 100 and the image display apparatus 200 mounted in a vehicle cannot access the Internet.

In this case, the mobile terminal 100 and the image display apparatus 200 mounted in a vehicle need to access the Internet using an Internet accessible device.

The mobile terminal 100 and the image display apparatus 200 mounted in a vehicle may require roaming for Internet access. In this case, the mobile terminal 100 and the image display apparatus 200 mounted in a vehicle should access the Internet through a device that does not require roaming because Internet access without using a roaming service is cost-effective.

Accordingly, the mobile terminal 100 and the image display apparatus 200 mounted in a vehicle require a method by which they can efficiently provide the Internet service to a user by sharing Internet access information thereof in the above-described Internet access environments.

The table of FIG. 5 shows various Internet access environments according to Internet accessibility, WLAN role, etc. The mobile terminal 100 and the image display apparatus 200 mounted in a vehicle determine which device is used to access the Internet by sharing the Internet access information thereof.

The various Internet access environments shown in the table of FIG. 5 are described in detail below with reference to FIGS. 6 to 9.

FIGS. 6 to 9 illustrate various Internet access environments for the mobile terminal 100 and the image display apparatus 100 mounted in a vehicle according to embodiments of the present invention.

FIG. 6 shows an Internet access environment in which both the mobile terminal 100 and the image display apparatus 200 mounted in a vehicle can access the Internet.

In this case, the mobile terminal 100 and the image display apparatus 200 mounted in a vehicle may select one of them, which can efficiently access the Internet and access the Internet through a network of the selected device.

Specifically, the mobile terminal 100 and the image display apparatus 200 mounted in a vehicle may select the device capable of efficiently accessing the Internet by taking Internet access information thereof, such as a charging state, remaining battery capacity, available CPU capacity, roaming-related information of each device into account.

FIG. 7 shows an Internet access environment in which the image display apparatus 200 mounted in a vehicle cannot access the Internet while the mobile terminal 100 can access the Internet.

In this case, the mobile terminal 100 and the image display apparatus 200 mounted in a vehicle may access the Internet through the network of the mobile terminal 100.

FIG. 8 shows an Internet access environment in which the mobile terminal 100 cannot access the Internet while the image display apparatus 200 mounted in a vehicle can access the Internet.

In this case, the mobile terminal 100 and the image display apparatus 200 mounted in a vehicle may access the Internet through the network of the image display apparatus 200 mounted in a vehicle.

FIG. 9 shows an Internet access environment in which both the mobile terminal 100 and the image display apparatus 200 mounted in a vehicle cannot access the Internet.

In this case, the mobile terminal 10 and the image display apparatus 200 mounted in a vehicle cannot provide the Internet service to the user because they cannot access the Internet.

Here, the mobile terminal 10 and the image display apparatus 200 mounted in a vehicle may inform a user that the Internet service cannot be provided to the user.

The present invention may determine which device will be used for Internet access on the basis of Internet access information of the devices, such as information representing whether each device can access the Internet, information representing whether each device performs roaming, Internet accessibility, Internet accessible device preference of a user, etc.

A description will be given of Internet access information and a method of sharing the Internet access information in detail.

FIG. 10 illustrates a method of transmitting Internet access information according to a first embodiment of the present invention.

The mobile terminal 100 is connected to the image display apparatus 200 mounted in a vehicle to construct a WLAN (S100). Here, the image display apparatus 200 mounted in a vehicle may be set as an access point and the mobile terminal 100 may be set as a client in the WLAN.

IP addresses, a communication protocol, etc. are assigned to the mobile terminal 100 and the image display apparatus 200 mounted in a vehicle for WLAN communication (S110 and S120).

The mobile terminal 100 and the image display apparatus 200 mounted in a vehicle generate Internet access information and transmit the Internet access information to the other devices for Internet access (S130).

The mobile terminal 100 and the image display apparatus 200 mounted in a vehicle determine which device will be used for Internet access using the Internet access information shared thereby. In addition, the mobile terminal 100 and the image display apparatus 200 mounted in a vehicle determine which device functions as an access point and which device functions as a client in WLAN communication.

The Internet access information will be described in detail below with reference to FIG. 11.

If the mobile terminal 100 serving as a client accesses the Internet using the network thereof in WLAN communication, the mobile terminal 100 modifies a routing table (S140).

In WLAN communication, a device serving as a client is set such that the device accesses the Internet through a device functioning as an access point.

Accordingly, the routing table of the client device includes address information of the access point device. If the mobile terminal 100 functioning as a client accesses the Internet through the network thereof, the mobile terminal 100 should modify a routing address to the address thereof.

The mobile terminal 100 and the image display apparatus 200 mounted in a vehicle perform WLAN communication as the access point and client set above (S150).

The mobile terminal 100 and the image display apparatus 200 mounted in a vehicle access the Internet through the Internet access device determined above (S160).

For example, an application being executed on the mobile terminal 100 accesses the Internet through the Internet access device set above.

FIG. 11 illustrates Internet access information according to the first embodiment of the present invention.

Referring to FIG. 11, the Internet access information according to the first embodiment of the invention includes "InternetAccessSupport", "tetheringSupport", "WLANSupport", "RoamingStatus", and "UserPreference". The Internet access information according to the first embodiment of the invention may be configured in a data structure called "Profile".

"InternetAccessSupport" is information representing whether a network of a device can access the Internet.

For example, "InternetAccessSupport" may include "active", "inactive", "disabled" and "none" as string values.

"Active" represents that an Internet accessible network of a device is active.

"Inactive" represents that an Internet accessible network of a device is inactive.

"Disable" represents that a network of a device cannot access the Internet. That is, "disabled" can be set when the corresponding device is disconnected from the Internet.

"None" represents that an Internet accessible network is not established for a device.

"TetheringSupport" is information representing whether a network of a device supports tethering.

For example, "tetheringSupport" may include "active", "inactive", "disabled" and "none" as string values.

"Active" represents that a tethering supportable network of a device is active.

"Inactive" represents that a tethering supportable network of a device is inactive.

"Disable" represents that a network of a device cannot support tethering.

"None" represents that a tethering supportable network is not established for a device.

"WLANSupport" includes information about a role of a device in a WLAN environment.

For example, "WLANSupport" may include "AP" and "CLIENT" as string values.

"AP" represents that a device functions as an access point in the WLAN environment.

"CLIENT" represents that a device serves as a client in the WLAN environment.

"RoamingStatus" is information representing whether a device accesses the Internet using the roaming service.

For example, a Boolean value of "RoamingStatus" may be set to "1" when the roaming service is used and set to "0" when the roaming service is not used.

"UserPreference" is information on user preference for a device selected for Internet access.

For example, "UserPreference" may include numeral information about preference as an integer value. That is, "UserPreference" may be set to a large number for a device corresponding to high user preference.

FIG. 12 illustrates a function of the Internet access information according to the first embodiment of the present invention.

As shown in FIG. 12, the function of the Internet access information includes "GetProfile" and "SetProfile".

"GetProfile" is a function for receiving Internet access information of a selected device.

"SetProfile" is a function for generating Internet access information of a corresponding device.

FIG. 13 illustrates a method of transmitting Internet access information according to a second embodiment of the present invention.

The method of transmitting Internet access information according to the second embodiment of the present invention is based on a common data bus and a service binary protocol of mirror link.

For Internet access information transmission, the mobile terminal 100 functioning as a WLAN client may include a NetworkConfig Client 300 and the image display apparatus 200 functioning as a WLAN AP may include a NetworkConfig Server 400.

In addition, for bi-directional communication of the Internet access information, the mobile terminal 100 as the WLAN client and the image display apparatus 200 as the WLAN AP may include both the NetworkConfig client 300 and NetworkConfig Server 400.

The mobile terminal 100 and the image display apparatus 200 mounted in a vehicle perform initialization for carrying out a mirror link service (S200).

The NetworkConfig Client 300 requests internet access information to the NetworkConfig Server 400 (S210).

The NetworkConfig Server 400 checks the Internet access information transmission request from the NetworkConfig Client 300 (S220) and transmits the requested Internet access information (S230).

In the present invention, the NetworkConfig Server 400 may transmit the Internet access information only when the NetworkConfig Client 300 requests the Internet access information. Otherwise, the NetworkConfig Server 400 may transmit the Internet access information to the NetworkConfig client 300 when the Internet access information is changed. And, the NetworkConfig Server 400 may transmit the Internet access information to the NetworkConfig client 300 at a predetermined time.

FIG. 14 illustrates Internet access information according to the second embodiment of the present invention.

Referring to FIG. 14, the Internet access information according to the second embodiment of the invention includes "InternetAccessSupport", "tetheringSupport", "WLANSupport", "RoamingStatus", and "UserPreference". The Internet access information according to the second embodiment of the invention may be configured in a data structure called "NetworkConfig".

"InternetAccessSupport" is information representing whether a network of a device can access the Internet.

For example, "InternetAccessSupport" may include "active", "inactive", "disabled" and "none" as string values.

"Active" represents that an Internet accessible network of a device is active.

"Inactive" represents that an Internet accessible network of a device is inactive.

"Disable" represents that a network of a device cannot access the Internet. That is, "disabled" can be set when the corresponding device is disconnected from the Internet.

"None" represents that an Internet accessible network is not established for a device.

"TetheringSupport" is information representing whether a network of a device supports tethering.

For example, "tetheringSupport" may include "active", "inactive", "disabled" and "none" as string values.

"Active" represents that a tethering supportable network of a device is active.

"Inactive" represents that a tethering supportable network of a device is inactive.

"Disable" represents that a network of a device cannot support tethering.

"None" represents that a tethering supportable network is not established for a device.

"WLANSupport" includes information about a role of a device in a WLAN environment.

For example, "WLANSupport" may include "AP" and "STA" as string values.

"AP" represents that a device functions as an access point in the WLAN environment.

"STA" represents that a device serves as a client in the WLAN environment.

"RoamingStatus" is information representing whether a device accesses the Internet using the roaming service.

For example, a Boolean value of "RoamingStatus" may be set to "1" when the roaming service is used and set to "0" when the roaming service is not used.

"UserPreference" is information on user preference for a device selected for Internet access.

For example, "UserPreference" may include numeral information about preference as an integer value. That is, "UserPreference" may be set to a large number for a device corresponding to high user preference.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An image display apparatus mounted in a vehicle, comprising:
   a processor configured to:
   control the image display apparatus to operate as an access point for accessing the Internet without using a mobile terminal as the access point or to operate as a client for accessing the Internet through the mobile terminal as the access point,
   wherein in response to the image display apparatus not being able to access the Internet and the mobile terminal being able to access the Internet, the processor is further configured to control the image display apparatus to operate as the access point and control the mobile terminal to operate as the client; and
   an interface connecting the image display apparatus to the mobile terminal,
   wherein the processor is further configured to control the interface to transmit Internet access information to the mobile terminal, the Internet access information including Internet access state information representing whether the image display apparatus is connected to the Internet, wherein the mobile terminal and the image display apparatus are linked to each other through a wireless local area network (WLAN), wherein the Internet access information further includes WLAN information representing whether the image display apparatus is set to the access point or the client in the WLAN, wherein the processor controls the image display apparatus to operate as the access point and controls the mobile terminal to operate as the client in response to the Internet access state information, and wherein:

in response to the Internet access state information indicating both the image display apparatus and the mobile terminal being able to access the Internet, and the WLAN information indicating the mobile terminal operating as the access point and the image display apparatus operating as the client, the processor is further configured to access the Internet using the mobile terminal, in response to the Internet access state information indicating both the image display apparatus and the mobile terminal being able to access the Internet, and the WLAN information indicating the mobile terminal operating as the client and the image display apparatus operating as the access point, the processor is further configured to access the Internet using either the image display apparatus or the mobile terminal according to user preference information, in response to the Internet access state information indicating the image display apparatus not being able to access the Internet and the mobile terminal being able to access the Internet, and the WLAN information indicating the mobile terminal operating as the access point and the image display apparatus operating as the client, the processor is further configured to access the Internet using the mobile terminal, in response to the Internet access state information indicating the image display apparatus not being able to access the Internet and the mobile terminal being able to access the Internet, and the WLAN information indicating the mobile terminal operating as the client and the image display apparatus operating as the access point, the processor is further configured to access the Internet using the mobile terminal, and in response to the Internet access state information indicating the image display apparatus being able to access the Internet and the mobile terminal not being able to access the Internet and the WLAN information indicating the mobile terminal operating as the client and the image display apparatus operating as the access point, the processor is further configured to access the Internet using the image display apparatus.

2. The image display apparatus of claim 1, wherein the processor controls the interface to receive a request for the Internet access information of the image display apparatus from the mobile terminal.

3. The image display apparatus of claim 1, wherein the processor controls the interface to transmit a changed Internet access information to the mobile terminal when the Internet access information is changed.

4. The image display apparatus of claim 1, wherein the Internet access information further includes tethering information representing whether an external device connected to the image display apparatus is able to access the Internet through the image display apparatus.

5. The image display apparatus of claim 2, wherein the Internet access information further includes roaming state information representing whether a roaming service is used for Internet access of the image display apparatus, and wherein the processor is further configured to control the image display apparatus to operate as an access point for accessing the Internet without using the mobile terminal as the access point or to operate as a client for accessing the Internet through the mobile terminal as the access point, based on the roaming state information.

6. The image display apparatus of claim 1, wherein the processor is further configured to preliminarily set one of the image display apparatus and the mobile terminal as the client based on capacities of the image display apparatus and the mobile terminal, when communication between the image display apparatus and the mobile terminal is initiated.

7. The image display apparatus of claim 1, wherein the processor is further configured to preliminarily set the mobile device as the client when communication between the image display apparatus and the mobile terminal is initiated.

8. A mobile terminal comprising:

a hardware-embedded wireless communication processor providing wireless communication with an external image display apparatus in a vehicle; and a processor configured to:

control the mobile terminal to operate as an access point for accessing the Internet without using the external image display apparatus as the access point or to operate as a client for accessing the Internet through the external image display apparatus as the access point, wherein in response to the external image display apparatus not being able to access the Internet and the mobile terminal being able to access the Internet, the processor is further configured to control the external image display apparatus to operate as the access point and control the mobile terminal to operate as the client, wherein the processor controls the hardware-embedded wireless communication processor to transmit Internet access information to the external image display apparatus, the Internet access information including Internet access state information representing whether the mobile terminal is connected to the Internet, wherein the mobile terminal and the external image display apparatus are linked to each other through a wireless local area network (WLAN), wherein the Internet access information further includes WLAN information representing whether the mobile terminal is set to the access point or the client in the WLAN, and wherein the processor controls the external image display apparatus to operate as the access point and controls the mobile terminal to operate as the client in response to the Internet access state information, and wherein:

in response to the Internet access state information indicating both the external image display apparatus and the mobile terminal being able to access the Internet, and the WLAN information indicating the mobile terminal operating as the access point and the external image display apparatus operating as the client, the processor is further configured to access the Internet using the mobile terminal, in response to the Internet access state information indicating both the external image display apparatus and the mobile terminal being able to access the Internet, and the WLAN information indicating the mobile terminal operating as the client and the external image display apparatus operating as the access point, the processor is further configured to access the Internet using either the external image display apparatus or the mobile terminal according to user preference information, in response to the Internet access state information indicating the external image display apparatus not being able to access the Internet and the mobile terminal being able to access the Internet, and the WLAN information indicating the mobile terminal operating as the access point and the external image display apparatus operating as the client, the processor is further configured to access the Internet using the mobile terminal, in response to the Internet access state information indicating the external image display apparatus not being able to access the Internet and the mobile terminal being able to access the Internet, and the WLAN information indicating the mobile terminal operating as the client and the external image display apparatus operating as the access point, the processor is further configured to access the Internet using the mobile terminal, and in response to the Internet access state information indicating the external image display apparatus being able to access the Internet and the mobile terminal not being able to access the Internet, and the WLAN information indicating the mobile terminal operating as the client and the external image display apparatus operating as the access point, the processor is further configured to access the Internet using the external image display apparatus.

9. The mobile terminal of claim 8,
wherein the processor controls the hardware-embedded wireless communication processor to receive a request for the Internet access information of the mobile terminal from the external image display apparatus.

10. The mobile terminal of claim 8,
wherein the processor controls the hardware-embedded wireless communication processor to transmit a changed Internet access information to the external image display apparatus when the Internet access information is changed.

11. The mobile terminal of claim 8,
wherein the Internet access information further includes tethering information representing whether an external device connected to the mobile terminal is able to access the Internet through the mobile terminal.

12. A data processing method of an image display apparatus mounted in a vehicle, the data processing method comprising:
controlling, via a processor of the image display apparatus, the image display apparatus to operate as an access point for accessing the Internet without using a mobile terminal as the access point or to operate as a client for accessing the Internet through the mobile terminal as the access point;
in response to the image display apparatus not being able to access the Internet and the mobile terminal being able to access the Internet, controlling, via the processor, the image display apparatus to operate as the access point and the mobile terminal to operate as the client;
generating, via the processor, Internet access information, the Internet access information including Internet access state information representing whether the image display apparatus is connected to the Internet;
transmitting, via an interface of the image display apparatus, the generated Internet access information to the mobile terminal; and
controlling, via the processor, the image display apparatus to operate as the access point and the mobile terminal to operate as the client in response to the Internet access state information,
wherein the mobile terminal and the image display apparatus are linked to each other through a wireless local area network (WLAN),
wherein the Internet access information further includes WLAN information representing whether the mobile terminal or the image display apparatus is set to the access point or the client in the WLAN, and
wherein:
in response to the Internet access state information indicating both the image display apparatus and the mobile terminal being able to access the Internet, and the WLAN information indicating the mobile terminal operating as the access point and the image display apparatus operating as the client, the processor accesses the Internet using the mobile terminal, in response to the Internet access state information indicating both the image display apparatus and the mobile terminal being able to access the Internet, and the WLAN information indicating the mobile terminal operating as the client and the image display apparatus operating as the access point, the processor accesses the Internet using either the image display apparatus or the mobile terminal according to user preference information, in response to the Internet access state information indicating the image display apparatus not being able to access the Internet and the mobile terminal being able to access the Internet, and the WLAN information indicating the mobile terminal operating as the access point and the image display apparatus operating as the client, the processor accesses the Internet using the mobile terminal, in response to the Internet access state information indicating the image display apparatus not being able to access the Internet and the mobile terminal being able to access the Internet, and the WLAN information indicating the mobile terminal operating as the client and the image display apparatus operating as the access point, the processor accesses the Internet using the mobile terminal, and in response to the Internet access state information indicating the image display apparatus being able to access the Internet and the mobile terminal not being able to access the Internet, and the WLAN information indicating the mobile terminal operating as the client and the image display apparatus operating as the access point, the processor accesses the Internet using the image display apparatus.

13. The data processing method of claim 12, further comprising:
receiving a request for the Internet access information of the image display apparatus from the mobile terminal.

14. The data processing method of claim 12, wherein the Internet access information is generated when the Internet access information is changed.

15. The data processing method of claim 12, wherein the Internet access information further includes tethering information representing whether an external device connected to the mobile terminal or the image display apparatus is able to access the Internet through the mobile terminal or the image display apparatus.

\* \* \* \* \*